United States Patent [19]
Greene et al.

[11] 3,993,115
[45] Nov. 23, 1976

[54] TIRE TRUING MACHINE

[76] Inventors: Aubrey E. Greene; Thomas F. Layfield, both of Rte. No. 2, Ellaville, Ga.

[22] Filed: Oct. 17, 1975

[21] Appl. No.: 623,307

[52] U.S. Cl. ................................ 157/13; 82/4 E; 82/49
[51] Int. Cl.² .................. B29H 21/08; B23B 3/22; B23B 37/00
[58] Field of Search .................. 82/49; 4 E; 157/13

[56] References Cited
UNITED STATES PATENTS

| | | | |
|---|---|---|---|
| 1,242,448 | 10/1917 | Judelshon | 82/49 |
| 1,891,789 | 12/1932 | Wheeler | 157/13 |
| 2,243,461 | 5/1941 | Haskins | 157/13 |
| 2,805,713 | 9/1957 | Barrett | 157/13 |
| 2,810,238 | 10/1957 | Yoho et al. | 157/13 |
| 2,893,479 | 7/1959 | Sheridan et al. | 82/4 E |

*Primary Examiner*—Harrison L. Hinson
*Attorney, Agent, or Firm*—Edwin E. Greigg

[57] ABSTRACT

A tire truing machine having a carrier for supporting and moving a motor-driven cutter to and from a mounted and driven wheel having a tire with means to vary the travel of the cutter according to the desired contour of the tire, including a new and improved cutter head having means for mounting the cutter blade onto the motor drive shaft so that the distance between the cutter blade and the housing may be closely controlled to prevent dirt and rubber from entering the motor housing and further having a new and improved means for both automatic and manual sharpening of the cutter blade, and more importantly, for preventing rubber from being drawn between the carbides and the blade to prevent binding of the machine.

6 Claims, 8 Drawing Figures

TIRE TRUING MACHINE

BACKGROUND OF THE INVENTION

1. Field of the Invention

This invention pertains to the tire truing art, and more particularly, relates to an improved tire truing machine having an improved cutter head assembly.

2. Description of the Prior Art

It is well known to provide different types of rotary cutters to trim the thread of a driven wheel mounted tire, to remove high spots therefrom and to provide a truly round tire. In such machines means are provided for supporting a driven tire and a carrier is provided for a cutter head assembly with a motor driven cutter blade. The carrier is moved by means of hand operated longitudinal and transverse adjusting screws and radius rods are used so as to vary the travel of the cutter blade according to the desired contour of the tire. The cutter blades have an annular shaped cutting edge which extends at an angle relative to the tire to provide a smooth finish to the tire tread and means have also been provided for sharpening such a blade.

However, it has been found that the cutter head assemblies of such machines must be improved in the area of the means of mounting the cutter blade on the driving means and in the means for sharpening the blades.

Accordingly, it is an object of this invention to provide a new and improved cutter head for tire truing machines having a new and improved means of mounting the cutter blade on a drive shaft and a new and improved means of providing automatic as well as manual sharpening of the blade.

SUMMARY OF THE INVENTION

The foregoing objects are accomplished in this invention by providing a cutter head in a tire truing machine which is mounted in the conventional way on a carrier for movement to and from a driven tire. The cutter head is provided with a threaded drive shaft which cooperates with a threaded sleeve as a means by which the cutter blade can be adjustably mounted on the drive shaft. The ends of the shaft and sleeve combine to position the blade relative to the cutter head housing.

Another feature of the invention is the means for mounting the sharpening stone relative to the cutter blade. One stone is mounted in a cradle which is spring-loaded against the tapered side of the cutting edge of the blade and means are provided for controlling the position and angularity of the stones relative to the blade. A pair of carbides are also spring-loaded on the back portion of the blade with zero clearance to continually sharpen the outer edge thereof, and to prevent cut rubber from entering and binding the machine.

BRIEF DESCRIPTION OF THE PREFERRED EMBODIMENT

Figure 1:
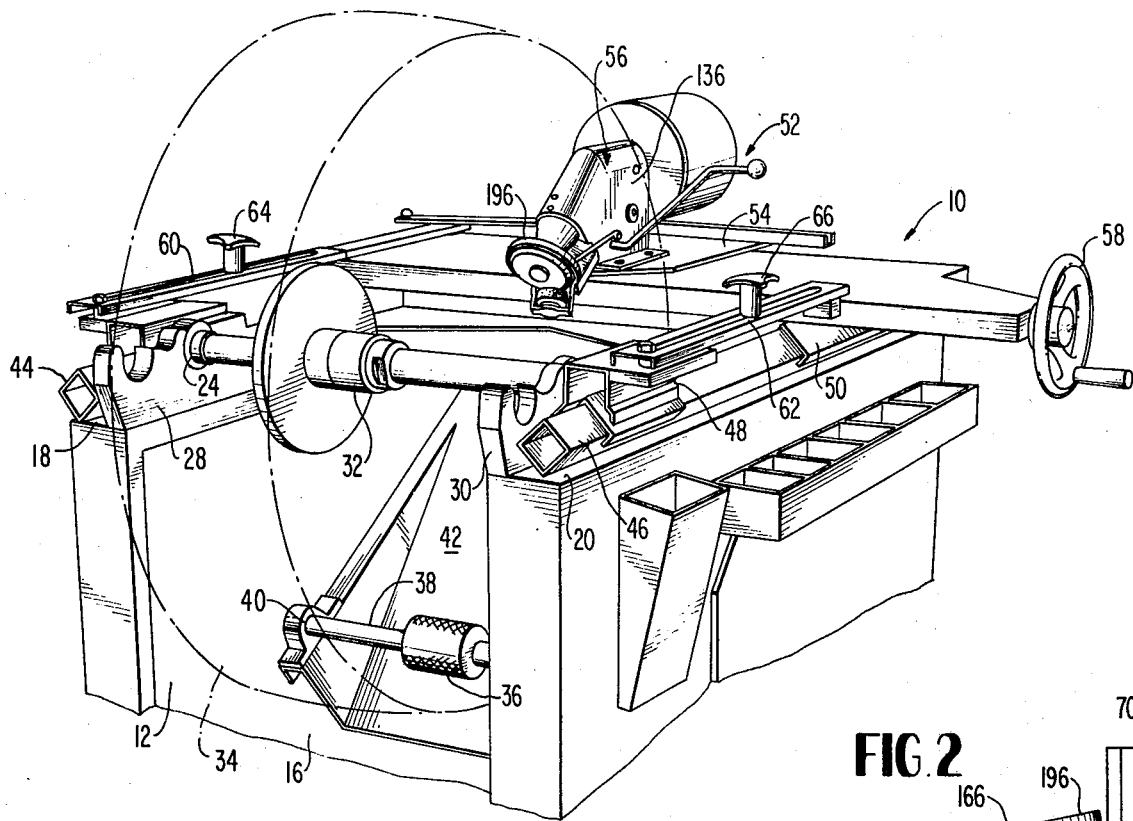
FIG. 1 is a perspective view of the tire truing machine of the present invention.

The tire truing machine 10 of the invention includes a supporting frame having a pair of similar paneled sides 12 and 14, a paneled rear end (not shown) and an open throated front end 16.

The upper edges of the sides 12 and 14 are provided with similar flanges 18 and 20, respectively, on which elements of the tire truing mechanism are supported. This includes a supporting mandrel 22 suitably journalled in bearing means 24 and 26 which are supported in bearing supports 28 and 30 and provided with suitable axially adjustable adapters, indicated in their entirety as 32, between which a wheel or other tire mount may be secured for rotation with the mandrel 22 by engagement of the periphery of the mounted tire 34 with a roller 36. Knurled roller 36 is mounted for rotation on a shaft 38 and suitably journalled in a pair of bearing means 40 (one shown) and carried by an inclined table or chute 42. This roller 36 is resiliently pressed into driving contact with the tire periphery and rotative drive is imparted to the roller by suitable means, such as a belt and pulley drive means, from an electric motor (not shown). This roller drive means may accommodate tires of different sizes and the mandrel and bearing means can be placed in either pairs of notches in the bearing supports 28, 30, depending on the tire size. The means for driving the roller, as herein mentioned but not shown, is conventional and no further description thereof is deemed necessary herein.

Extending longitudinally of, and affixed to, the side flanges 18 and 20 are guide bars 44 and 46 carrying two pairs of longitudinally slidable guide followers, one of each pair shown at 48 and 50. The rear pair of guide followers 50 support cutter assembly 52 which include platform 54 and a motor driven cutter assembly 56, the adjustment of which cutter assembly is conventionally provided by an adjusting screw and hand wheel mounted at the rear of the frame, but not shown in these drawings, for movement to and from the tire 34. To provide for transverse movement, a transverse feed screw is affixed to the platform 54 and operated by a hand wheel 58.

The front pair of guide followers 48 are pivotally secured the forward ends of radius rods 60 and 62, both of which comprise pairs of telescoping members for adjusting their effective length and clamping screws 64 and 66, respectively, for maintaining fixed adjustment. The rear ends of the radius rods are conventionally connected with the platform 54. The purpose of these radius rods is to adjust the cutter according to the curvature of the tire tread or periphery by application of an appropriately curved template so that the platform 54, during its travel transversely of the frame, will transverse an arc of a proper radius to advance and retract the cutter in proper truing cutting and engagement of the tire periphery.

As hereinbefore mentioned, an important aspect of the present invention relates to the proper adjustment of the cutter blade relative to the bearing housing to keep rubber cut from the tire being trued from jamming between the bearing housing and the blade. Another aspect of the invention is the proper sharpening of the blade by the provision of sharpening stones and the means of applying carbides to the blade for the appropriate sharpening of the blade. The description of the machine which accomplishes the foregoing will now be described.

Turning now to FIGS. 2–6, it can be seen that the cutter head assembly 56 comprises a motor 70 which drives the cutter blade 72 through a pair of universal joints 74 and 76 which provide the blade with the proper cutting angle relative to the tire forward of the platform 54. As shown more clearly in FIG. 4, the motor shaft 78 of the motor 70 is connected by any suitable means to a shaft 80 forming the first shaft of the pair of universal joints, which ultimately connects to output shaft 82 by any suitable means and at that end is held in bearing means 84 journalled in bearing housing 86. The output shaft 82 is provided with a reduced portion 88 which extends outwardly of the end of the bearing housing and which is provided with external threads 90 located adjacent the ledge 92 formed by the reduced portion. The external threads 90 are to receive an adjusting sleeve 94 which is internally threaded to mate with the threads 90. The end of the output shaft is bored and tapped as at 96 to receive a bolt 98 which, together with the washer 100, holds the cutter blade 72 on the end of the shaft. The adjusting sleeve 94 is received in a sleeve bearing bushing 102 for rotation with the output shaft which, together with the bearing 84, journals the shaft 82 and the adjusting sleeve 94 which rotate in unison within the bearing housing 86 and form the drive means for the cutter blade 72.

The bearing housing 86 comprises a cylindrical solid member which is externally gradually tapered as at 104 toward one end where it is flared to provide a flange 106 adjacent the back side of the cutter blade 72. The inner portion of the bearing housing is bored and counterbored to receive the bearing 102 and a seal 108 as well as the bearing 84 and thus provides chamber 110 for grease to lubricate the bearings.

As hereinabove mentioned, it is important in the operation of a tire truing apparatus that pieces of rubber and dust do not become wedged between the rotating blade and the stationary housing, yet at the same time, the blade should be kept as close as possible to the rotating blade. This is accomplished in the present invention by the use of the adjusting sleeve 94 and the threads 90 and the drive shaft 82. In the embodiment disclosed, as described above, the blade 72 is held on the end of the shaft by means of the bolt and washer combination 98, 100 threaded into the end of the shaft. However, the spacing between the back of the blade and the end of the shaft can be controlled by the threaded adjusting sleeve 94 whose end is adjustable relative to the end of the shaft by means of its position on the shaft as controlled by the threading of the sleeve on the shaft. By the proper selection of the position of the sleeve relative to the shaft, the clearance between the housing and the backside of the blade is properly controlled. In an actual embodiment, the clearance can be as much as 0.005 inch utilizing feeler gauges and a spanner wrench on the adjusting sleeve 94.

As also hereinabove mentioned, another feature of this invention is the proper sharpening of the blade, and the means to accomplish this will now be described.

Turning now to the means of sharpening the blade, attention is directed specifically to FIGS. 2–7a where it can be seen that a first carbide, indicated in its entirety as 112, is carried by a carriage 114 which is U-shaped or to form a saddle-type carriage comprising two arms 116, 118 joined at one end as a transverse arm 120 on which the stone is carried. In the embodiment shown, the stone is round and fastened by a bolt 122 to the transverse arm through a suitable bearing means beneath a dust cover 124. The bearing means permits the stone to rotate as it engages the blade. On the opposite extremities of the arms 116 and 118, there is provided a sleeve 126 (see FIG. 5) formed integral therewith and bored to receive a transverse mounting shaft 128. The mounting shaft extends through the housing 130 and is connected for rotation with the sleeve by a set screw 132. The housing 130, as shown, extends around a portion of the bearing housing 86 with parallel sides 134 and 136 extending downwardly to the top of the carriage 54 where they are attached thereto.

The shaft 128 is mounted eccentrically within an outer housing 138, the outer periphery of which is mounted concentric with the housing walls 134, 136 so that concentric rotation of the outer mounting housing causes the shaft 128 to move eccentrically. The mounting housing 136 is provided with an adjustment panel 140 located on the outer side of the housing wall 134 (see FIG. 3) and is provided with an arcuate slot 142 concentric with the center of the mounting housing center. Positioning of the panel 140 serves to position the shaft 128. Thus, the carriage 114 and the sharpening stone 112 can be adjusted angularly as well as longitudinally of the blade, particularly relative to the conical edge 144. Once positioned, a set screw 148 holds the panel 140 in the selected position until further adjustment of the carriage is desired.

Figure 2:
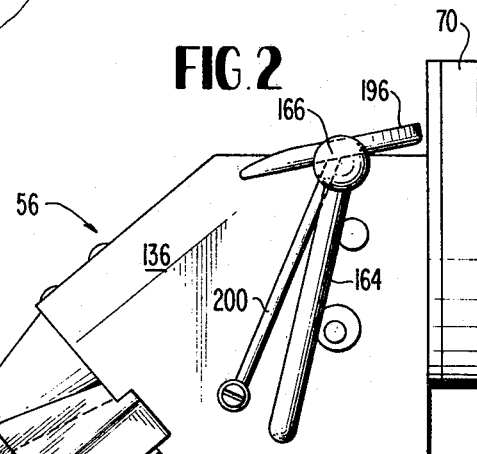
FIG. 2 is an enlarged elevational view illustrating the cutter head as a subassembly.
Figure 3:
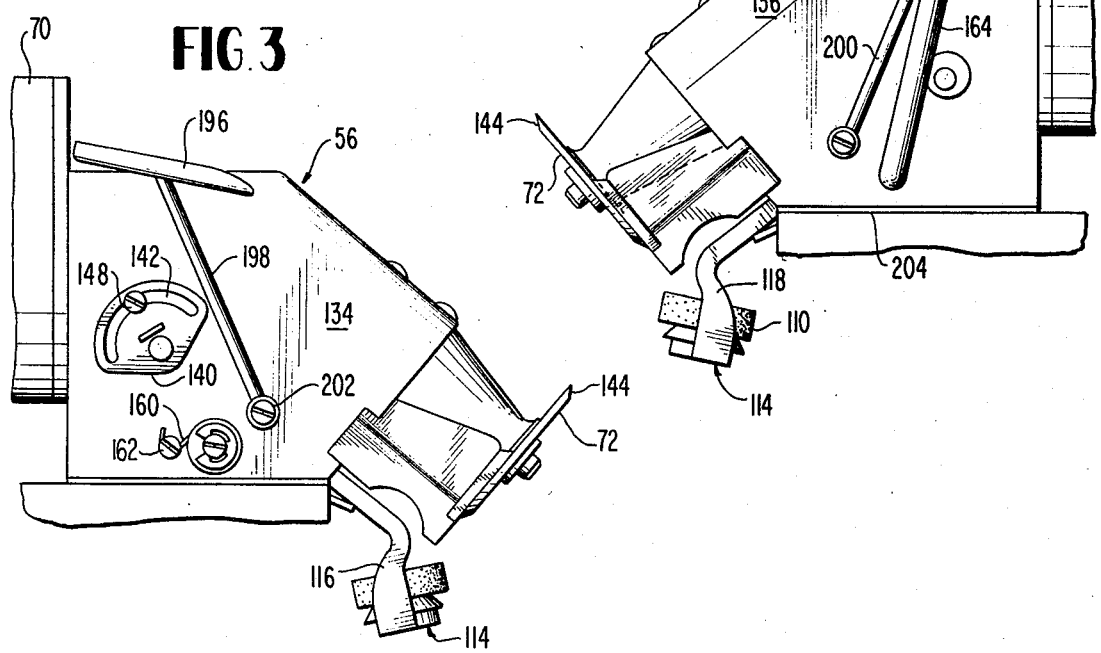
FIG. 3 is another elevational view of the cutter head subassembly showing the side opposite that shown in FIG. 2.
Figure 4:
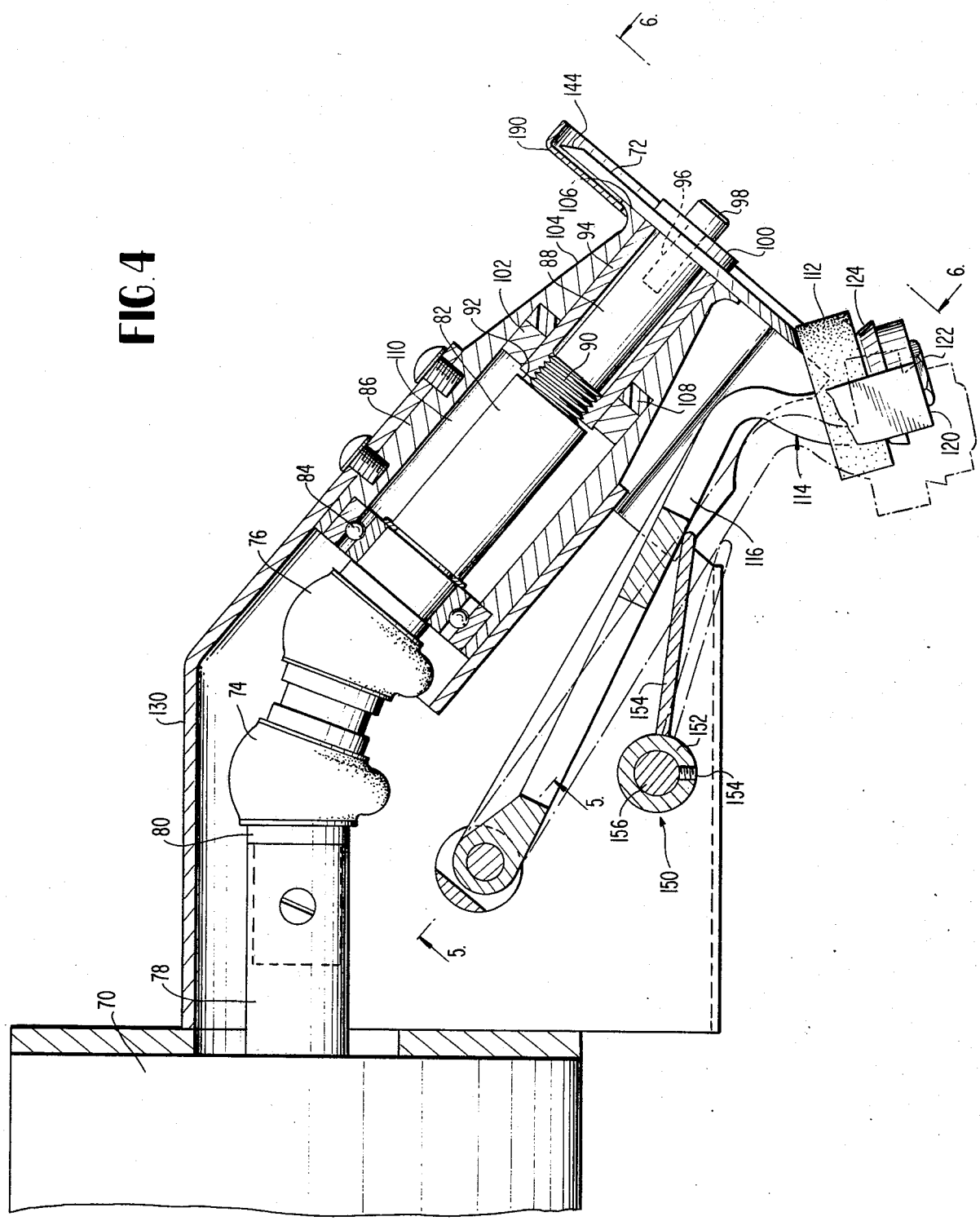
FIG. 4 is an enlarged detail view of the cutter head subassembly with a portion broken away to show the details thereof.
Figure 5:
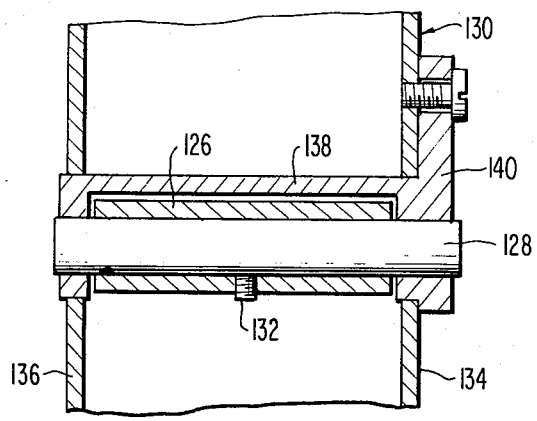
FIG. 5 is a cross-sectional view taken along line 5—5 of FIG. 4.
Figure 6:
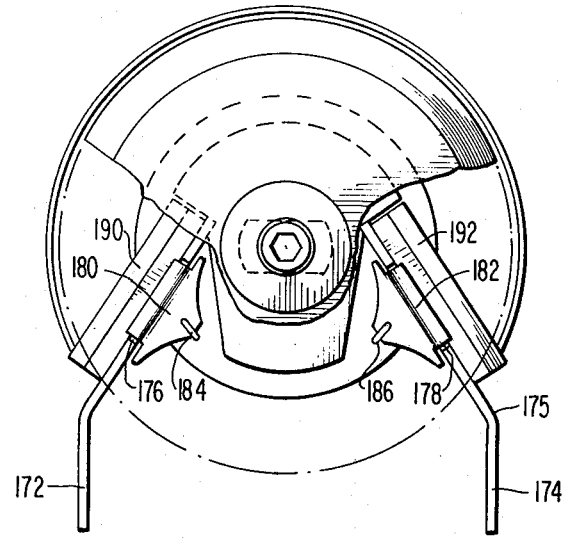
FIG. 6 is a front view taken along line 6—6 of FIG. 4 and showing the mounting of the carbides.
Figure 7:
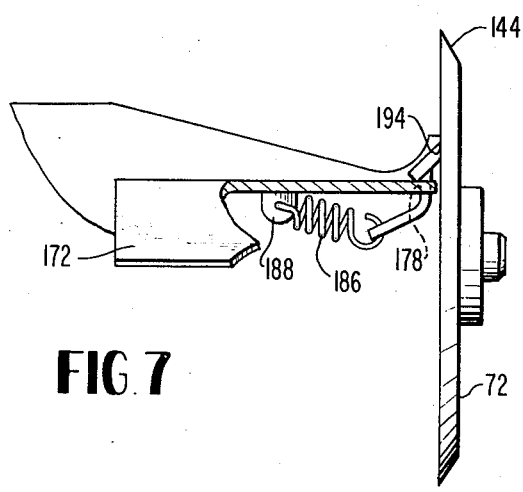
FIG. 7 is a side view showing the mounting of the carbides in more detail.
Figure 7A:
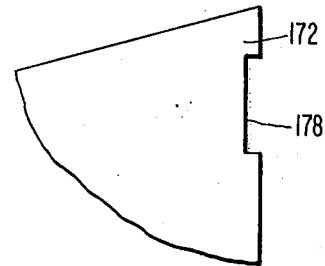
FIG. 7a is a side view of a part of the housing showing a specific detail of the mounting of the carbides.

Beneath the carriage 114, and in resilient engagement therewith, is a spring-actuated automatic means 150 for automatically holding the stone 112 in engagement with the blade. This automatic means 150 comprises a sleeve 152 with a plate-like arm 154 extending therefrom into engagement with the carriage 114. The sleeve 152 is bored to receive a shaft 156 and attached thereto by a set screw 58. The sleeve is spring-biased to rotate counterclockwise as shown in FIGS. 3 and 4, by a coil spring 160 clearly shown in FIG. 3, with the tension of the spring being adjustable by the set screw 162. The two positions in and out of engagement with the cutter blade 72 is shown in FIG. 2 with the outer engagement position shown in phantom.

Shaft 156, as shown, is the horizontal portion of a longer rod 164 which is bent so as to be parallel to the side wall 136 of the housing and provided with a knob 166 (see FIGS. 1 and 2) to form a handle for actuating the automatic spring means 150. In one position of the handle, the spring means holds the stone 112 against the blade and in another position of the handle the blade is free of the stone, such position of the stone being shown in phantom in FIG. 4. In this position of the handle the carriage 114 is free also to be operated normally to bring the stone into engagement with the blade if desired.

With the foregoing automatic and manual sharpening of the conical surface 144 of the blade 72 having been described, attention is now directed again to FIGS. 6–7a where it can be seen that the legs or skirts 172 and 174 of a cover 175 for a portion of the bearing housing 86 are provided with a pair of notches 176 and 178

(one shown in FIG. 7a) which face the blade and in which a pair of holder brackets 180 and 182 pivot. These holder brackets are curved and extend on the outside of the skirts as well as inwardly of the cover back in the direction of the motor. At their inner extremity they are each connected to tension springs 184 and 186 which are fastened to tabs (one shown at 118) which are suitably affixed as by welding to the skirts. The end of the holder brackets 180 and 182 are silver soldered to a pair of carbides 190 and 192.

Thus, it can be seen that the spring tension of bias springs 184 and 186 provide a zero clearance between the back end of the blade 72 and keeps the blade burr-free and with a keen edge thereon. These carbides are ground to a sharp edge (as shown at 194 in FIG. 7) to conform to the edge of the blade and with the zero clearance (provided by the spring tension acting on the carbide), rubber is prevented from binding to the machine. More particularly as in FIG. 7, as at 194, the carbide is ground to an angle to provide better sliding and sharpening action on the blade and to prevent it from digging against the edge of the blade.

Finally, as shown in FIGS. 1–3, the cutter head 56 is provided with a cover member 196 shaped to the contour of the cutter blade 72 and mounted in the housing 130 by a pair of rods 198, 200 which engage the side walls 134, 136 and are pivoted as at 202 and 204. This cover is placed over the blade as shown in FIG. 1, and removed for operation of the cutter head as shown in FIGS. 2 and 3.

What is claimed is:

1. In a tire truing machine including means for supporting and rotating a tire on its axis,
    platform means and means for imparting sliding movement to said platform along a preselected path according to the desired contour to be cut on the periphery of said tire, and
    a cutter head assembly mounted on said platform, the improvement in the cutter head comprising:
    motor means,
    an output shaft driven by said motor means,
    a bearing housing for supporting said output shaft,
    a rotatable cutting tool means for mounting said cutting tool on said output shaft,
    means for adjusting the position of said cutting tool relative to said bearing housing comprising sleeve means threadably engaging said output shaft and coextensive therewith, the position of said sleeve relative to said shaft and cooperating with mounting means positions said cutting tool relative to the bearing housing, and means for sharpening said cutting tool.

2. The tire truing apparatus in claim 1 wherein said means for adjusting the position of said cutting tool comprises a sleeve means disposed concentric with said output shaft, said sleeve means being adjustably positioned on said output shaft so that the ends of the sleeve means are substantially coextensive with the end of said output shaft, both of which are relatively coextensive with the end of said bearing housing, said sleeve being threaded on said output shaft, the means for mounting the cutting tool on said output shaft and cooperating with said sleeve means, the position of said sleeve means determining the position of said cutting tool relative to said bearing housing.

3. The tire truing machine as claimed in claim 1 wherein said means for sharpening said cutting tool comprises a carriage means pivotally mounted on said cutter head assembly with a sharpening stone detachably mounted on the end of said carriage means opposite said pivotal connection and juxtaposed the cutting tool, resilient means tending to push said carriage means tending to resiliently urge said carriage means toward said rotatable cutting tool, and means for operating said resilient means to urge said stone into engagement with the tapered edge of said cutting tool.

4. The tire truing machine as claimed in claim 3 further including means for moving said pivotal mounting to adjust the position of said stone relative to said tapered edge.

5. The tire truing apparatus in claim 3 wherein said bearing housing is provided with abrasive means detachably mounted thereon for resiliently engaging said cutting tool and positioned to engage the side of said cutting tool adjacent the bearing housing.

6. The tire truing apparatus as claimed in claim 5 wherein said abrasive means comprises a pair of sharpening carbides and mounted on a bracket and means for spring-biasing said carbides against the blade for sharpening the blade and for preventing rubber from entering and binding the machine.

* * * * *

UNITED STATES PATENT AND TRADEMARK OFFICE
CERTIFICATE OF CORRECTION

PATENT NO. : 3,993,115
DATED : November 23, 1976
INVENTOR(S) : Aubrey E. Greene et al It is certified that error appears in the above-identified patent and that said Letters Patent are hereby corrected as shown below:

Column 3, Line 48, "blade" should be -housing-

Signed and Sealed this

Twenty-seventh Day of September 1977

[SEAL]

Attest:

RUTH C. MASON
Attesting Officer

LUTRELLE F. PARKER
Acting Commissioner of Patents and Trademarks